United States Patent [19]
Torok et al.

[11] 4,435,041
[45] Mar. 6, 1984

[54] CHROMATIC ABERRATION CORRECTION IN A MULTIWAVELENGTH LIGHT BEAM DEFLECTION SYSTEM

[75] Inventors: Ernest J. Torok; William A. Harvey, both of Minneapolis, Minn.

[73] Assignee: Sperry Corporation, New York, N.Y.

[21] Appl. No.: 382,857

[22] Filed: May 28, 1982

[51] Int. Cl.³ .................................................. G02B 5/18
[52] U.S. Cl. .................................. 350/162.24; 350/375
[58] Field of Search ................. 350/162.2 Y, 374–380, 350/384, 394

[56] References Cited

U.S. PATENT DOCUMENTS

| | | | |
|---|---|---|---|
| 3,410,624 | 11/1968 | Schmidt | 350/379 |
| 3,520,592 | 7/1970 | Lieb et al. | 350/379 |
| 4,281,905 | 8/1981 | Harvey et al. | 350/377 |

*Primary Examiner*—Bruce Y. Arnold
*Assistant Examiner*—William Propp

*Attorney, Agent, or Firm*—Kenneth T. Grace; Thomas J. Scott; Marshall M. Truex

[57] ABSTRACT

An apparatus for and a method of correcting chromatic aberration in a multiwavelength input light beam deflection system incorporating a magneto-optic diffraction grating is disclosed. The diffraction grating generates a chromatic aberration induced plurality of first order light beams from the multiwavelength input light beam, each different wavelength light beam being deflected a correspondingly different angle λ by the diffraction grating. Correction plates, designed to provide zero chromatic correction for a wavelength $\lambda_o$ with corresponding positive and negative chromatic correction for wavelengths about the wavelength $\lambda_o$, and associated lenses, parallelize, focus and coaxialize the first order light beams along an output optical axis whereby the chromatic aberration induced first order light beams are combined at the output of the apparatus along an output optical axis, the deflection angle of which is determined by the diffraction grating induced deflection angle of the light of wavelength $\lambda_o$.

7 Claims, 3 Drawing Figures

CHROMATIC ABERRATION CORRECTION IN A MULTIWAVELENGTH LIGHT BEAM DEFLECTION SYSTEM

BACKGROUND OF THE INVENTION

1. Field of the Invention

The present invention relates to the field of optics and in particular to a light deflection system for the steering of a small diameter beam of light in a predetermined direction.

2. Description of the Prior Art

In the E. J. Torok et al, U.S. Pat. No. 3,752,563 there is illustrated a magneto-optic light deflector system that utilizes the stripe domains in a magnetic film as a diffraction grating. The angle of deflection of the light beam from the plane of the film is varied by varying the intensity of a magnetic DC field in the plane of the film or by varying the intensity of a magnetic DC field normal to the plane of the film. The orientation of the stripe domains is varied by varying the direction of the DC field in the plane of the film while the film's hysteresis is overcome by a magnetic AC tickle field that is oriented perpendicular to the stripe domains. The normally incident light beam is diffracted by the film-forming diffraction grating to generate a single zero'th order light beam, which is oriented along the optical axis of the normally incident light beam, and a pair of conjugate first order light beams, which are the light beams that are deflected along the new optical axes.

In the E. J. Torok U.S. Pat. No. 3,861,784 there is disclosed a programmable diffraction grating that utilizes the stripe domain diffraction grating of the E. J. Torok et al U.S. Pat. No. 3,752,563 that which further includes means for varying the separation of adjacent domain walls and the rotatable orientation of the parallel stripe domains. The resulting system is utilized to control the focus of a light beam that is directed upon the plane of the film. The apparatus includes a plurality of stripline arrays that are configured to permit the individual and selective control of the separation and orientation of the domain walls in each portion of the film. This selective control of the domain wall separation and orientation in each part of the film permits an arbitrary configuration of domain walls of substantially continuously varying spacing and direction. These varying domain wall arrangements permit the performance of various image processing functions.

In the W. A. Harvey et al U.S. Pat. No. 4,281,905 there is disclosed a magneto-optic light deflector system that includes two converging half-lenses of equal focal length, that may be formed from a single circular converging lens, a circular center portion of which may be removed and which may then be cut in half along a diameter. The two converging half-lenses are oriented superposed with their optical axes common and orthogonal to the plane of the magneto-optic light deflector with their optical axes aligned with the optical axis of the light beam that is directed normally incident to the plane of the magneto-optic light deflector. The two half-lenses parallelize the prime and conjugate first order light beams that are generated by the magneto-optic light deflector, which light beams are then focussed by a convex lens upon a screen or detector.

In these above discussed magneto-optic light deflector systems, the light that is utilized is a monochromatic light beam, such as is provided by a coherent laser light source. However, it is most desirable to utilize a multichromatic or multiwavelength light beam in a magneto-optic light deflector system, as for performing signal processing upon data modulated white light. However, because of chromatic aberration in a multi-wavelength light beam incorporating a magneto-optic diffraction grating, such prior art systems cannot utilize a multiwavelength beam.

SUMMARY OF THE INVENTION

The present invention permits the use of a multiwavelength, e.g., white or ambient, light beam in a magneto-optic light deflector system, in contrast to the prior art systems that use single wave length, coherent, e.g., laser, light beams. Because the magneto-optic light deflector, as does a glass lens unless corrected, deflects different wavelengths of light at different angles, with wavelength, provision must be made to correct for this chromatic aberration. In the present invention, two chromatic aberration correction plates are designed to provide zero correction to light of a wavelength $\lambda_o$. The two correction plates are oriented intermediate two convex lenses, all four of which elements have their optical axes aligned with the optical axis of the input light beam. The different angle deflected light beams are then successively parallelized, focussed, coaxialized and then directed along an output optical axis that is at the same angle $\phi_o$ to the input optical axis.

INTRODUCTION

The stripe domain light deflector is a diffraction grating whose periodicity and orientation are alterable by an externally applied magnetic field. However, like all diffraction gratings, the stripe domain light deflector deflects light of longer wavelengths larger angles, i.e., chromatic aberration, so that when white, i.e. multiwavelength, light enters the light deflector, the different colors are diffracted at different angles, creating a rainbow effect. While there are many uses for a light deflector that is designed to steer only monochromatic light, e.g. light from a laser, there are also applications for steering broad band, i.e. multiwavelength, light. For example, one such application is for imaging and scanning light from passively illuminated objects or from objects emitting infrared (I.R.) light. The following explains how correction for chromatic aberration can be implemented in a stripe domain light deflector system. The small angle approximation is used throughout.

ALL-GLASS CHROMATIC CORRECTION PLATE

The index of refraction of glass is dispersive, i.e. it varies with the wavelength of light. For this reason a glass prism deflects the different wavelengths of multiwavelength light different angles, thus separating the colors of the spectrum. Glass lenses, unless corrected, do the same thing; the focal length is a function of light wavelength. This is called chromatic aberration.

Chromatic aberration is corrected in lenses by making a chromatic correction plate of a compound lens. One part is concave, one part is convex. The two parts have different compositions such that the dispersion of the convex part is compensated for by the dispersion of the concave part. One can invert this effect to maximize the dispersion and minimize the magnifying power. A correction plate can be made from two lenses, one of crown glass and one of flint glass. This is analogous to a direct vision prism. The crown glass lens is a converging lens, while the flint glass lens is a diverging lens with an equal but opposite focal length for light of a given wavelength, e.g., the sodium D line $\lambda = 5890$ Angstroms (Å). The compound lens will then not bend yellow light at all, i.e. it will act like plate glass for $\lambda = 5890$ Å. However, it will act like a converging lens for red light and act like a diverging lens for blue light.

IDEAL CHROMATIC CORRECTION PLATE

An ideal correction plate is a compound lens which bends light as if it were a single lens having an index of refraction given by $$n - 1 = k\left[\frac{\lambda - \lambda_o}{\lambda}\right] \quad (1)$$

where k is an arbitary constant. The focal length of the compound lens would then be given by $$f = \frac{C\lambda}{\lambda - \lambda_o} \quad (2)$$

where C is a constant depending on the curvature of the lens components.

Figure 1A:
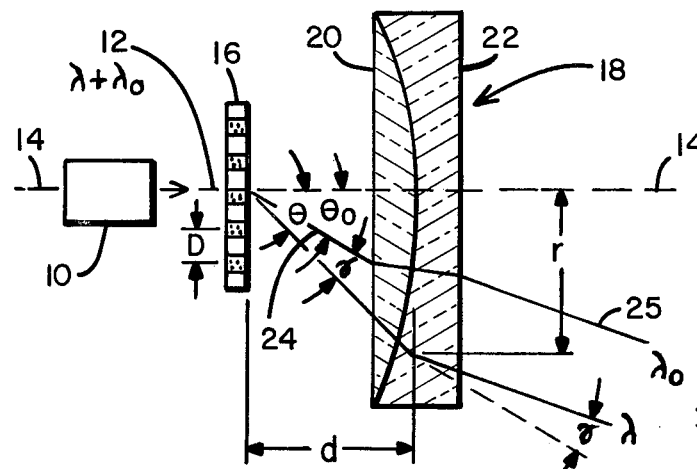
FIG. 1a is an illustration of a first light deflection system that parallelizes two light rays of different wavelengths.

With particular reference to FIG. 1a, there is illustrated a light deflection system wherein a source 10 of a multiwavelength light beam 12 of wavelengths $\lambda$ and $\lambda_o$ is directed along input optical axis 14 normally incident to the plane of stripe domain light deflector 16. The angle of deflection for light of wavelengths $\lambda$ and $\lambda_o$, respectively is $$\theta = \sin^{-1}\lambda/D \simeq \lambda/D$$

$$\theta_o = \sin^{-1}\lambda_o/D \simeq \lambda_o/D \quad (3)$$

where D is the grating constant, i.e., the separation between adjacent stripe domain walls. When the light passes through the correction plate 18, formed of convex lens 20 and concave lens 22 both of which are refractive effect lenses, the ray of $\lambda_o$ light leaves the correction plate 18 on an exit path 25 that is parallel to its entrance path 24; however, the $\lambda$ light is deflected an angle $$\gamma = r/f \quad (4)$$

where r is the distance of the ray from the center of the plate. If the spacing between light deflector 16 and correction plate 18 is d, then $$r = d \tan \theta \simeq \theta d \quad (5)$$

and from equation 3, $$r = (\lambda d/D) \quad (6)$$

so equation (4) becomes $$\gamma = (\lambda d/Df) \quad (7)$$

and from equation (2), $$\gamma = \frac{d(\lambda - \lambda_o)}{DC} \quad (8)$$

Now the object of the correction plate 18 is to make the ray of light emerge parallel to the ray of light $\lambda_o$. This will occur if $$\theta - \theta_o = \gamma$$

i.e. $\frac{\lambda}{D} - \frac{\lambda_o}{D} = \frac{d}{DC}(\lambda - \lambda_o)$ This holds if $d = C$. Thus the correction plate 18 works exactly for all wavelengths of light $\lambda$ and for all values of stripe domain grating constant D and for all angles $\theta$ and orientations of stripe domain reflection. Thus, this correction plate corrects exactly for all wavelengths and all deflection angles.

EXAMPLE OF AN ALL-GLASS CORRECTION PLATE

Equations (1) and (2) are not necessarily fulfilled by any two real materials. However, it is possible to adjust any two materials so that $$\frac{d(\theta - \theta_o - \gamma)}{d\lambda} = 0 \text{ when } \lambda = \lambda_o \quad (9)$$

In other words, the deflection will be achromatic for wavelengths near $\lambda_o$ instead of $0 < \lambda < \infty$.

For example, if borasilicate crown glass BSC ICT type 600/665 is used for the converging lens and extra dense flint EDF-3 ICT type 720/291 for the diverging lens, the ration of focal lengths of former to latter should be $-0.69444$.

If the diverging lens has a 1" focal length, the focal length of the plate at the red C line ($\lambda = 6562$ Å) is 267.0" while the focal length of the plate at the blue F line ($\lambda = 4861$ Å) is $-98.2$".

One can adjust the ration of focal lengths of red light to blue light by adding a third lens of intermediate composition. However, the disadvantage of an all-glass correction plate is that the focal lengths must be large. If one were to use them in a system, one would want to use many in series, or use thick lenses analogous to a direct viewing prism.

COMBINATION GRATING AND GLASS LENS CORRECTION PLATE

Figure 1B:
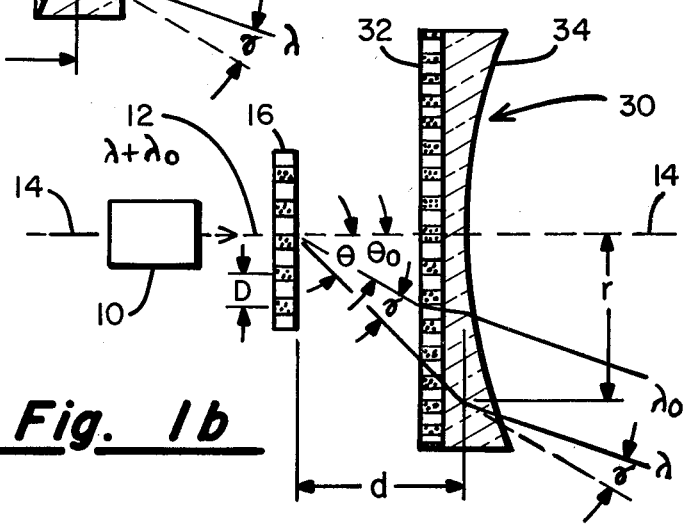
FIG. 1b is an illustration of a second light deflection system that parallelizes two light rays of different wavelengths.

With particular reference to FIG. 1b there is illustrated a light deflection system similar to that of FIG. 1a wherein correction plate 18 is replaced by correction plate 30 that is formed of a converging diffraction effect (Fresnel) lens 32 and a diverging refractive lens 34.

A Fresnel lens 32 can be constructed from a blazed grating in which the grating constant D is inversely proportional to the distance r from the center of the lens. The blazing directs all the light into the desired first order. The focal length of such a lens is inversely proportional to the wavelength of the light, because of the grating equation $$D \sin \theta = \lambda \qquad (10)$$

where D is the grating "constant."

In a Fresnel lens, the grating "constant," D is nearly inversely proportional to the distance, r, from the center of the lens:

$$D = \frac{F\lambda(1 + r^2/F^2)^{\frac{1}{2}}}{r} \approx \frac{F\lambda}{r} \qquad (11)$$

Here, F is the focal length of the lens for a given wavelength $\lambda$. Let $F_o$ be the focal length for a particular wavelength, $\lambda_o$. Then the focal length $F(\lambda)$ for other wavelengths is given by:

$$F(\lambda) = F_o \lambda_o / \lambda \qquad (12)$$

A correction plate can be constructed by combining a blazed converging (convex) Fresnel lens and a diverging (concave) glass lens into a single compound lens. This compound lens will have zero power (focal point at infinity) for a particular wavelength $\lambda_o$. For longer wavelengths the lens will be converging. For shorter wavelengths it will be diverging.

The focal length f of the compound lens is found by adding the reciprocals of the focal lengths of the components:

$$\frac{1}{f} = \frac{1}{F(\lambda)} - \frac{1}{F_o} = \frac{1}{F_o}\left[\frac{\lambda}{\lambda_o} - 1\right] \qquad (13)$$

The equation corresponding to equation 8 is given now by $$\gamma = \frac{\lambda d}{DF_o}\left[\frac{\gamma}{\gamma_o} - 1\right] \qquad (14)$$

Since this is a correction plate we wish the two rays to emerge parallel. The lack of parallelism is given by $$\theta - \theta_o - \gamma = \frac{\lambda}{D} - \frac{\lambda_o}{D} - \frac{\lambda d}{DF_o}\left[\frac{\lambda}{\lambda_o} - 1\right] \qquad (15)$$

and if we specifiy that $d = F_o$ $$\theta - \theta_o - \gamma = \frac{-\lambda_o}{D}\left[\frac{\lambda}{\lambda_o} - 1\right]^2 \qquad (16)$$

Thus the combination of a blazed grating and a glass lens correction plate works very well for wavelengths near $\lambda_o$, fulfilling equation (9).

CONFIGURATION FOR WIDE BEAMS

If one desires the different wavelength rays to emerge superposed instead of separated but parallel, and if one wishes to use wide beams, a more complex configuration is required.

Figure 2:
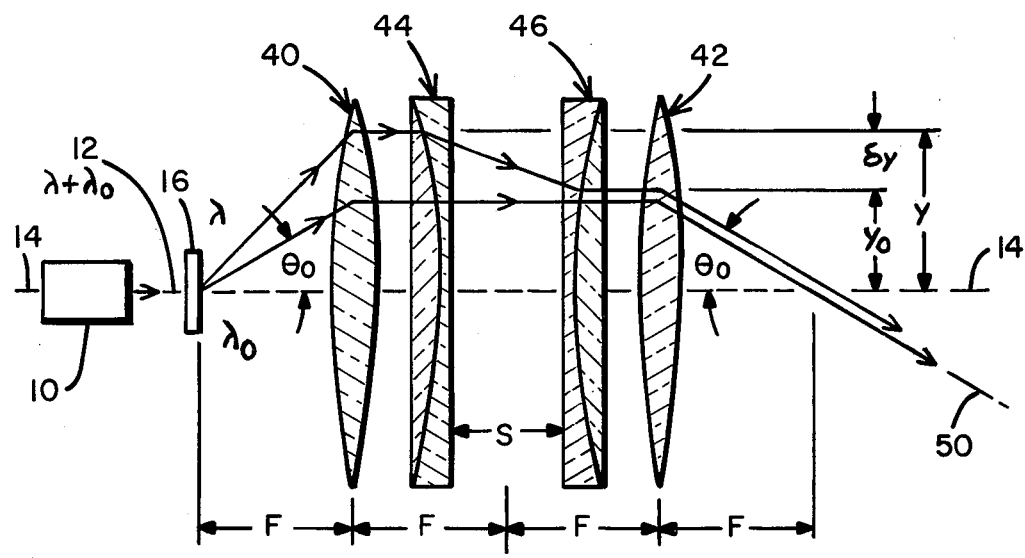
FIG. 2 is an illustration of a light deflection system incorporating the present invention.

With particular reference to FIG. 2 there is illustrated a light deflection system in which two lenses 40 and 42 and two glass correction plates 44 and 46 are used. The first lens 40 is placed one focal length (F) away from the light deflector 16. The second lens 42 is placed two focal lengths (2F) from the first lens 40. This spacing is required in order that a collimated beam of light emerging from the light deflector 16 will be collimated when emerging from the second lens 42.

The embodiment of FIG. 2 uses two correction plates 44 and 46 instead of one. The first correction plate 44 acts as a converging lens for $\lambda > \lambda_o$. The second acts as a diverging lens for $\lambda > \lambda_o$. The two correction plates 44 and 46 are arranged like a Galilean telescope with a common focal point for each $\lambda$ far to the right of the second lens 42 and with their centers coaxial along optical axis 14. The first correction plate 44 causes the central ray of the $\lambda$ beam to coincide with the central ray of the $\lambda_o$ beam at the second correction plate 46. The second correction plate 42, acting as a diverging lens for the $\lambda$ beam, bends the central $\lambda$ ray parallel to the system's optical axis 14. The second lens 42 collimates the light and causes both $\lambda$ and $\lambda_o$ rays to pass through its focal point, reversing the angle $\theta_o$ of the light deflection along an output optical axis 50.

Let the separation between the two correction plates 44 and 46 be s and let the focal length of the first correction plate 44 be $f(\lambda)$ such that $$f(\lambda) = \frac{\lambda s}{(\lambda - \lambda_o)} \qquad (17)$$

Using the small angle approximation as before, we find that the light deflector 16 with grating constant a causes the ray of wavelength $\lambda$ to be a distance $y = F(\lambda/a)$ from the system's optical axis 14. The first correction plate 44 causes the ray to be deviated an angle $y/f(\lambda)$ and to be lowered a distance $\delta y = sy/f(\lambda)$. The resulting distance from the system optical axis 14 is $$y - \delta y = y\left[1 - \frac{s}{f(\lambda)}\right] = y\left[1 - \frac{s(\lambda - \lambda_o)}{\lambda s}\right] = \frac{y\lambda_o}{\lambda} = \frac{F\lambda}{a}\left[\frac{\lambda_o}{\lambda}\right] = y_o. \qquad (18)$$

Thus the first correction plate 44 causes the ray of wavelength $\lambda$ to coincide with the ray of wavelength $\lambda_o$ at a distance $y_o$ above the system optical axis 14. This must be true for all $\lambda$ for which equation (17) holds.

The second compensation plate, 46, is of opposite sign to the first, i.e., for $\lambda > \lambda_o$ it acts as a diverging lens. The focal point of this second plate 46 coincides with the focal point of the first plate 44, so together they act as a Galilean telescope. The result is that (1) the central $\lambda$ ray becomes identical with the central $\lambda_o$ ray, and (2) all light leaving the negative compensation plate is collimated.

Practically speaking, one may not be able to obtain materials for the second compensation plate to ensure that the focal points of the two compensation plates coincide exactly for all $\lambda$ of interest. However, if the second compensation plate is slightly stronger than the first, the focal points will coincide for three wavelengths of interest, giving good but not quite perfect compensation for wavelengths in between.

Another advantage of this configuration is that there is ample room to accommodate the correction plates 44 and 46 because the first lens 40 puts the rays parallel to the system optical axis 14. Thus, relatively thick correction plates or multiple correction plates can be used.

What is claimed is:

1. A light deflection system including chromatic correction comprising:
   an alterable diffraction grating;
   a source of a multiwavelength input light beam that is directed along an input optical axis that intersects said grating;
   said diffraction grating generating a plurality of first order light beams from said input light beam, each different wavelength of said input light beam being deflected a correspondingly different angle from said optical axis for generating a corresponding first order light beam;
   first and second lenses oriented with their optical axes coaxial with said input optical axis, said first lens spaced a focal length from said grating, said second lens spaced a distance from said first lens that is the sum of focal lengths of said first and second lenses;
   first and second correction plates oriented with their optical axes coaxial with said input optical axis and intermediate said first and second lenses, said first plate positive, said second plate negative and spaced a distance apart such that their focal points coincide for at least three wavelengths of interest.

2. The light deflector system of claim 1 in which said first and second correction plates provide zero correction to a light beam of $\lambda_o$ wavelength and in which said diffraction grating deflects said light beam of $\lambda_o$ wavelength at an angle $\theta_o$ with respect to said input optical axis; and
   said second correction plate deflects said coaxialized 1'st order light beams along said output optical axis at an angle $\theta_o$ with respect to said input optical axis.

3. The light deflection system of claim 1 in which said first plate positive is a positive chromatic correction plate, comprising:
   a refractive condensing lens of a first material;
   a refractive diverging lens of a second material;
   said first material having a dispersive coefficient different than the dispersive coefficient of said second material;
   the sum of the reciprocals of the focal lengths of said condensing lens and of said diverging lens being equal to zero for a particular wavelength of light $\lambda_o$; and,
   the sum of said reciprocals of focal lengths increasing with increasing wavelength of light in the region near said particular wavelength of light $\lambda_o$.

4. The light deflection system of claim 1 in which said second plate negative is a negative chromatic correction plate comprising:
   a refractive condensing lens of a first material;
   a refractive diverging lens of a second material;
   said first material having a dispersive coefficient different than the dispersive coeficient of said second material;
   the sum of the reciprocals of the focal lengths of said condensing lens and of said diverging lens being equal to zero for a particular wavelength of light $\lambda_o$; and,
   the sum of said reciprocals of focal lengths decreasing with increasing wavelength of light in the region near said particular wavelength of light $\lambda_o$.

5. The light deflection system of claim 1 in which said first plate positive is a positive chromatic correction plate, comprising:
   a diffraction effect first lens;
   a refractive effect second lens;
   the sum of the reciprocals of the focal lengths of said first and second lenses being equal to zero for a particular wavelength of light $\lambda_o$; and,
   the sum of said reciprocals of focal lengths increasing with increasing wavelength of light in the region near said particular wavelength of light $\lambda_o$.

6. The light deflection system of claim 1 in which said second plate negative is a negative correction plate comprising:
   a diffraction effect first lens;
   a refractive effect second lens;
   the sum of the reciprocals of the focal lengths of said first and second lenses being equal to zero for a particular wavelength of light $\lambda_o$; and,
   the sum of said reciprocals of focal lengths decreasing with increasing wavelength of light in the region near said particular wavelength of light $\lambda_o$.

7. A light deflection system including chromatic correction comprising:
   an alterable diffraction grating
   a source of a multiwavelength input light beam that is directed along an input optical axis that intersects said grating;
   said grating generating a plurality of first order light beams from said input light beam, each different wavelength of said input light beam being deflected a correspondingly different angle from said optical axis;
   first and second lenses oriented with their optical axes coaxial with said input optical axis, said first lens a focal length from said grating, said first and second lenses spaced apart a distance equal to the sum of their focal lengths;
   first and second correction plates oriented with their optical axes coaxial with said input optical axis and intermediate said first and second lenses, said first plate positive, said second plate negative and spaced a distance apart such that the principle rays of light of various wavelengths substantially coincide at a point on the second compensation plate, said second compensation plate of sufficient strength to substantially co-axialize said principle rays of various wavelengths.

* * * * *